July 29, 1930.    H. J. BRINKER    1,771,871
RAT TRAP
Filed Jan. 21, 1929
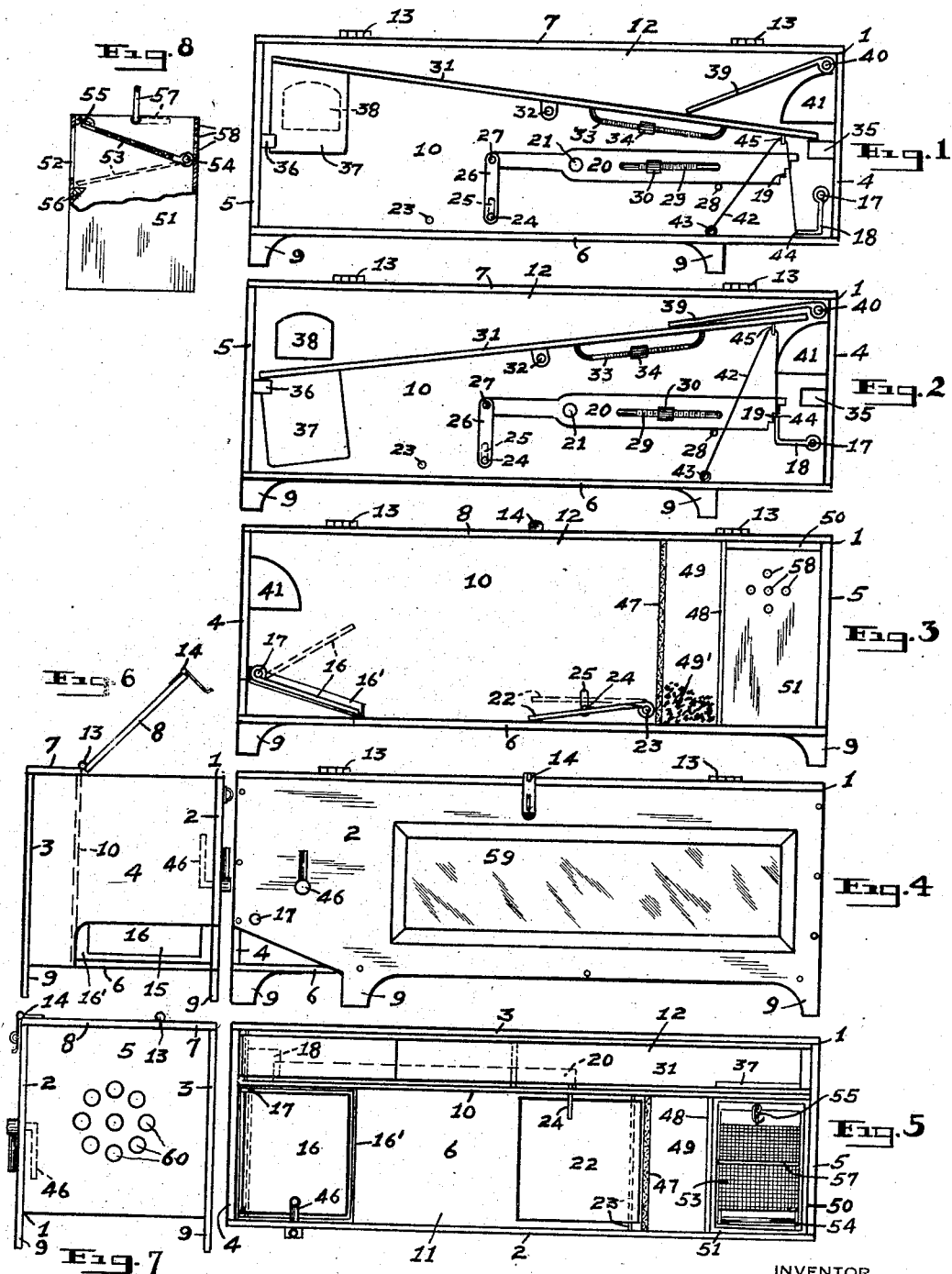

Patented July 29, 1930

1,771,871

UNITED STATES PATENT OFFICE

HENRY J. BRINKER, OF WHITAKER, PENNSYLVANIA

RAT TRAP

Application filed January 21, 1929. Serial No. 333,802.

My invention relates to certain new and useful improvements in rat traps, and important objects of the invention are to provide a rat trap of the character described, in a manner as hereinafter referred to, which is simple in its construction and arrangement, strong, durable and efficient in its use, automatic in its operation, positive in its action, compact, and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figures 1, 2 and 3 are side views of respective sides of my improved rat trap with the side walls removed therefrom.

Figure 4 is a front elevational view of a rat trap constructed in accordance with the invention.

Figure 5 is a top plan thereof with the top removed therefrom.

Figures 6 and 7 are end views of respective ends of the device.

Figure 8 is a side view, partly in cross section, of the removable container embodied in the invention.

Referring in detail to the drawing 1 denotes an oblong, rectangularly shaped casing, comprising the front side wall 2, the back side wall 3, the forward end wall 4, the rearward end wall 5, the bottom 6, the top member 7 and the top cover door 8.

The casing 1 is preferably provided with short legs 9 to space the casing bottom 6 above the floor or other structure upon which the device may be positioned.

The casing 1 is divided longitudinally of its length by a vertically disposed partition wall 10 to provide the front chamber 11 and a back chamber 12. The back chamber 12 is comparatively narrow and is closed at its top by the top member 7. The cover door 8 closes the top of the front chamber 11 and is hinged, as at 13, to the top member 7. The cover door 8 is provided with suitable securing elements 14 for securing the same in the closed position.

The forward lower corner of that portion of the casing 1, which constitutes the front chamber 11, is cut away to provide an angularly disposed entrance opening 15 to the front chamber 11. An entrance door 16, covering the entrance opening 15, is fixedly connected at its forward end, to the transversely extending shaft 17. The latter is disposed adjacent to the forward end wall 4 and is suitably journaled for rotation in the front side wall 2 and in the partition wall 10. When in the closed position the entrance door 16 rests upon and is surrounded by a vertically flanged frame 16' to prevent the liability of its being opened by a rodent while within the front chamber 11.

It will be noted that the entrance door 16 inclines at an angle. This inclination, together with the height of the casing legs 9, provides ample space to permit of the entrance of any sized rat through the corresponding inclined entrance opening 15.

An L-shaped catch member 18, of considerable width, is fixed to the inner end of the shaft 17 and is disposed in the back chamber 12. The catch member 18 is adapted to engage the notched forward end 19 of the trip bar 20 for maintaining the entrance door 16 in the elevated or open position, as shown in dash lines in Figure 3 of the drawing.

The trip bar 20 extends longitudinally horizontal in the rear chamber 12 and is pivotally connected, as at 21, to the partition wall 10. When the catch member 18 is in the depending inoperative position, as shown in Figure 1, the entrance door 16 is in the closed position, and when the catch member 18 is in engagement with the notched end 19 of the trip bar 20, the entrance door 16 is in the open position, as shown in dash lines in Figure 3.

A trip plate 22 is mounted in the front chamber 11 rearwardly of the entrance door 16. The trip plate 22 is pivotally connected, at its rear end, to a transversely extending shaft 23, which is journaled in the front side wall 2 and in the partition wall 10. The trip plate 22 is disposed adjacent to the casing floor 6 and carries a fixed laterally disposed connecting rod 24. The latter extends through an elongated, vertically disposed slot 25, which is formed in the partition wall 10. The back end of the connecting rod 24 is pivotally joined to a connecting link 26. The upper end of the latter is pivotally connected, as at 27, to the rearward end of the trip bar 20.

The pivotal connection 21, of the trip bar 20, is such that the forward portion of the latter overbalances the rearward portion thereof. In consequence, such overbalancing of the trip bar 20 will normally maintain the trip plate 22 elevated from the casing floor 6 a distance permitted by movement of the connecting rod 24 in the slot 25, as clearly shown in dash lines in Figure 3. Excessive overbalancing of the trip bar 20 is further prevented by a stop pin 28 which is fixed in the partition wall 10. The engagement of the trip bar 20 with the stop pin 28 maintains the former in the normal, horizontal, engaging position.

The trip bar 20 is provided with a fixed threaded rod 29 carrying a weight nut 30, which is adjustable on the threaded rod 29 to provide for the proper overbalancing weight of the trip bar 20 by gravity to best meet conditions.

A runway 31 is pivotally connected, for seesaw movements, as at 32, to the partition wall 10. The runway 31 is mounted in the back chamber 12 and extends longitudinally above the trip bar 20. The forward end of the runway 31 overbalances the rearward end thereof and carries a fixed threaded rod 33 which is provided with a weight nut 34 to assure such overbalancing action by gravity.

The length of the runway 31 approximates the length of the back chamber 12 and the downward movement of both ends thereof is limited by stop blocks 35 and 36, which are fixed to respective casing end walls 4 and 5.

The rearward end of the runway 31 carries a depending cover plate 37 which is fixed to the front side edge thereof. When the rearward end of the runway 31 is in the elevated position, as shown in Figure 1, the cover plate 37 closes a passage opening 38 which is formed in the rearward end of the partition wall 10 adjacent to the top of the latter. When the rearward end of the runway 31 is in its lowered position and rests upon the stop block 36 the cover plate 37 clears the passage opening 38, as shown in Figure 2.

A stop plate 39 is pivotally connected, as at 40, to the forward end of the partition wall 10, adjacent to the top of the latter. The rearward free end of the stop plate 39 rests upon the runway 31 adjacent to the forward end of the partition.

A passage opening 41 is formed adjacent to the top of the forward end of the partition wall 10. The passage opening 41 is disposed above the runway 31 when the forward end of the latter is in the lowered position, as shown in Figure 1, while the stop plate 39 is above the passage opening 41.

A flexible member 42, having one end connected in an eye bolt 43 fixed in the casing floor 6, and the other end thereof to the outer free end of the catch member 18, as at 44, passes slidably through an eye bolt 45 fixed in the lower side of the forward end of runway 31. The function of the flexible member 42 is to draw the catch member 18 into engagement with the notched end 19 of the trip bar 20 when the forward end of the runway 31 is shifting to its elevated position, as shown in Figure 2. Such movement of the catch member 18 will draw the entrance door 16 to the open position shown in dash lines in Figure 3.

The opening movement of the entrance door 16 may be regulated by a check member 46 which is mounted for frictional operation in the front side wall 2. The adjustment of the check member 46 limits the opening movement permitted to the entrance door 16 or secures the latter against any opening movement if desired or required.

A pair of vertically disposed, transversely extending partitions 47 and 48 divide the rearward end of the front chamber 11 into two compartments, respectively indicated at 49 and 50. The partition 47 is disposed forwardly of the partition 48 and is preferably constructed from wire mesh. The compartment 49 is disposed directly rearward of the trip plate 22 and is intended for storing any suitable bait 49' of any nature whatsoever.

The rearward confining compartment 50 is preferably provided for the reception of a removable container 51 in which the rats are ultimately confined. The front side of the container 51 is formed with an opening 52, which registers exactly with the passage opening 38 formed in the partition wall 10.

The container 51 is provided with a lid 53, which is hinged, as at 54, to the back wall of the container 51 at some distance from the top of the latter. Suitable securing elements 55 are provided for securing the lid 53 to the top of the front wall of the container 51, while the latter is in the receptive position in the compartment 50.

A horizontally extending ledge 56 is fixed to the front wall of the container 51 directly below the opening 52. When removing the container 51 from the compartment 50, the connecting elements 55 are released and the lid 53 is forced downwardly until it rests upon the ledge 56, as shown in dash lines in Figure 8, whereby the trapped rats are confined therebelow to prevent them escaping from the container 51 through the opening 52.

The container 51 is provided with a suitable pivoted handle 57 to facilitate its handling. The lid 51 is preferably constructed from wire mesh to afford visibility to determine the contents of the container 51 therethrough.

The rear wall of the container 51 is preferably filled with perforations 58, and the front wall 2 is provided with a transparent panel 59, preferably glass, for the purpose of providing light to inveigle the rodents to enter the trap.

It will, of course, be obvious that the container 51 need not necessarily be used, as the rats can be confined directly in the compartment 50. The rear end wall 5 is formed with a plurality of perforations 60 for the admittance of water for drowning the rodents by submerging the rear end portion of the trap in water.

In practice the operation of my improved rat trap is as follows:—The container 51, with the lid 53 thereof elevated by its securing elements 55, is positioned in the compartment 50. Bait 49′ is placed in the compartment 49, and the entrance door 16 is opened manually by shifting the same upwardly to the open position, as shown in dash lines in Figure 3.

When the entrance door 16 is being so shifted to the open position, the catch member 18 will shift likewise and engage the notched end 19, of the trip bar 20, as shown in Figure 2, as the entrance door 16 and the catch member 18 are fixed on the same shaft 17. This engagement of the catch member 18 by the notched end 19 of the trip bar 20 will maintain the entrance door 6 in the open position.

The trap is now properly set for operation. The rat enters into the front chamber 11 through the open entrance door 16 and naturally moves toward the bait 49′. In doing so, the rat must step upon the trip plate 22, which is normally in the elevated position, as shown in dash lines in Figure 3. The weight of the rat upon the trip plate 22 will depress the latter to the position shown in Figure 3. Such depression of the trip plate 22 will elevate the forward end of the trip bar 20, thereby releasing the catch member 18 from the notched end 19 of the latter, and causing the entrance door 16 to fall to the closed position, by gravity, as shown in Figure 3, while the catch member 18 will swing to the depending, inoperative position shown in Figure 1.

The dropping of the entrance door 16 to the closed position will trap and frighen the rat and he will leap through the passage opening 41 upon the lowered end of the runway 31 in the back chamber 12. The rat will now move rearwardly on the runway by elevating the free end of the stop plate 39. As soon as the rat clears the stop plate 39 the free end of the latter will drop by gravity to again engage the top of the runway 31, thereby preventing the return of the rat to the passage opening 41.

As the rat reaches the rear end portion of the ruway 31, his weight thereon will cause runway 31 to overbalance from its normal position, whereby the rear end of the runway 31 is lowered until it strikes the stop block 36, while the forward end thereof is elevated, as shown in Figure 2.

This overbalancing of the runway 31 will shift the cover plate 37, carried by the former, to clear the passage opening 38. The rat will leap through the passage opening 38 into the container 51, as the opening 52 in the latter is in exact registration with the passage opening 38 in the partition wall 10. When the rat leaves the runway 31, the latter will swing to its normal overbalanced position and cause the closing of the passage opening 38.

As the outer free end of the catch member 18 is connected to the eyebolt 43, in the casing bottom 6, by a flexible member 42, which slidably passes through the eye bolt 45 fixed in the under side of the forward end of the runway 31, the overbalancing of the runway 31, by the rat in the manner stated, will draw the catch member 18 upwardly into engagement with the notched forward end 19 of the trip bar 20. This movement of the catch member 18 will likewise draw the entrance door 16 to the open position, whereby the trap is again automatically set for catching the next rat.

If the trapped rats in the container 51 should happen to leap therefrom, upon the runway 31, when the passage opening 38 is reopened by the approach of a coming rat, they could not escape, but would return to the container 51.

When it is desired to remove the container 51 with the rats therein, the securing elements 55 are released, and the lid 53 is forcibly depressed until the free end thereof rests upon the ledge 56. The rats now cannot escape from the container 51, through the container opening 52. The container 51 may now be removed from its compartment 50 in the casing 1, by the handle 57, and submerged in water to drown the rats therein.

If the container 51 is not used, the check member 46, is adjusted to prevent liability of the entrance door 16 opening, while the rear end of the casing 1 is submerged to effect the drowning of the trapped rats. The check member 46 may also be adjusted to limit the opening distance of the entrance door 16, or further for securing the latter to prevent possible escape of the captured rats, when the trap is being handled.

The present invention provides a most efficient rat trap which is particularly designed to inveigle the rats to enter the same.

What I claim is:

1. In a rat trap, a casing provided with legs and having an entrance opening, an entrance door mounted in said entrance opening and opening upwardly in said casing, a trip member pivotally mounted in said casing, a runway pivotally mounted in said casing, means actuated by the depression of said trip member for effecting the closing of said entrance door, means actuated by the tilting movement of said runway for re-opening said entrance door and for maintaining the latter in the open position, and means carried by said casing and operable for limiting the opening movement of said entrance door or for securing the same in the closed position.

2. In a rat trap, a casing provided with legs and having an entrance opening, an entrance door mounted in said entrance opening and opening upwardly in said casing, a trip member pivotally mounted in said casing, a runway pivotally mounted in said casing, means actuated by the depression of said trip member for effecting the closing of said entrance door, means actuated by the tilting movement of said runway for re-opening said entrance door and for maintaining the latter in the open position, and means carried by said casing and operable for limiting the opening movement of said entrance door or for securing the same in the closed position, a portion of the front wall of said casing being transparent.

In testimony whereof I affix my signature.

HENRY J. BRINKER.